(12) United States Patent
Ott et al.

(10) Patent No.: US 7,770,974 B2
(45) Date of Patent: Aug. 10, 2010

(54) HEIGHT ADJUSTMENT DEVICE OF A VEHICLE SEAT AND A VEHICLE SEAT FITTED WITH IT

(75) Inventors: Helmut Ott, Denkendorf (DE); Simon Geiger, Donzdorf-Reichenbach (DE); Steffen Sailer, Metzingen (DE)

(73) Assignee: Festo AG & Co. KG, Esslingen (DE)

( * ) Notice: Subject to any disclaimer, the term of this patent is extended or adjusted under 35 U.S.C. 154(b) by 327 days.

(21) Appl. No.: 12/012,713

(22) Filed: Feb. 5, 2008

(65) Prior Publication Data

US 2008/0197684 A1 Aug. 21, 2008

(30) Foreign Application Priority Data

| Feb. 15, 2007 | (DE) | .................... 20 2007 002 243 U |
| Mar. 15, 2007 | (DE) | ........................ 10 2007 012 399 |

(51) Int. Cl.
 *B60N 2/16* (2006.01)
(52) U.S. Cl. .............................. 297/344.15; 297/344.16
(58) Field of Classification Search ............ 297/344.15, 297/344.16
See application file for complete search history.

(56) References Cited

U.S. PATENT DOCUMENTS

| 3,430,444 | A |   | 3/1969 | Kamp |
| 3,954,245 | A | * | 5/1976 | Costin ................. 297/344.16 X |
| 3,999,800 | A | * | 12/1976 | Penzotti .................. 297/344.16 |
| 4,057,122 | A | * | 11/1977 | Brownell et al. ..... 297/344.16 X |
| 4,461,444 | A | * | 7/1984 | Grassl et al. ........ 297/344.15 X |
| 4,733,847 | A | * | 3/1988 | Grassl ................. 297/344.16 X |
| 4,822,094 | A | * | 4/1989 | Oldfather et al. ..... 297/344.16 X |
| 4,946,145 | A | * | 8/1990 | Kurabe ................ 297/344.16 X |
| 5,176,355 | A | * | 1/1993 | Carter ................. 297/344.16 X |
| 5,542,638 | A | * | 8/1996 | Smith .................. 297/344.16 X |
| 5,651,585 | A | * | 7/1997 | Van Duser ............. 297/344.16 |
| 5,671,964 | A | * | 9/1997 | DeRees et al. ....... 297/344.15 X |
| 6,286,819 | B1 | * | 9/2001 | Ritchie et al. ........ 297/344.16 X |
| 6,340,152 | B1 | * | 1/2002 | Ritchie et al. ........ 297/344.16 X |
| 6,354,556 | B1 | * | 3/2002 | Ritchie et al. ........ 297/344.15 X |
| 6,371,456 | B1 | * | 4/2002 | Ritchie et al. ........ 297/344.16 X |
| 6,616,117 | B2 | * | 9/2003 | Gryp et al. ........... 297/344.15 X |
| 7,568,675 | B2 | * | 8/2009 | Catton ................. 297/344.16 X |

FOREIGN PATENT DOCUMENTS

| DE | 32 19 371 | 11/1983 |
| DE | 35 17 503 | 11/1986 |
| DE | 35 17 505 | 11/1986 |
| DE | 43 35 199 | 5/1995 |
| DE | 197 05 010 | 8/1997 |
| JP | 05213102 A * | 8/1993 ............ 297/344.16 |

* cited by examiner

*Primary Examiner*—Rodney B White
(74) *Attorney, Agent, or Firm*—Hoffmann & Baron, LLP (57) ABSTRACT

A height adjustment device of a vehicle seat comprises a control valve means for governing the degree of filling of a compressed air actuator. Following an alteration in the weight to be carried by the compressed air actuator there is a relative switching over movement between a component bearing a control cam slide and a component bearing an actuating member entailing the switch over of the control valve means. The relative switching over movement is a linear movement, the two components bearing the slide and the actuating member being guided for relative sliding linear motion in the direction of the switch over movement. Furthermore a vehicle seat having such a height adjustment device is provided.

36 Claims, 8 Drawing Sheets

HEIGHT ADJUSTMENT DEVICE OF A VEHICLE SEAT AND A VEHICLE SEAT FITTED WITH IT

BACKGROUND OF THE INVENTION

The invention relates to a height adjustment device of a vehicle seat, which comprises a control valve means serving for controlling the degree of filling of at least one compressed air actuator holding the seat body at a desired height and thereby providing a vertical elastic supporting action, such control valve means being so provided with at least one actuating member for cooperation with at least one control cam slide that in accordance with use dependent alteration of the weight to be borne by the at least one compressed air actuator a relative switching over movement causing the switching over of the control valve means takes place between a component bearing the control cam slide and another component bearing the associated actuating member.

The invention furthermore relates to a vehicle seat fitted with such a height adjustment device, comprising a seat body, which is arranged on a seat bracket fitted with a height adjustment device, such seat bracket having at least one compressed air actuator, with the aid of which the seat body may be set at different heights and is able to be vertically resiliently supported at the respectively set height, the seat bracket having at least two support elements changing the distance between them during vertical movement of the seat body, one support element of the seat bracket being kinematically coupled with at least one control cam slide, which so cooperates with at least one actuating member kinematically coupled with the other support element and associated with a control valve means serving for control of the degree of filling of the at least one compressed air actuator that in the case of an alteration in the use dependent weight carried by the at least one compressed air actuator a relative switch over between the at least one control cam slide and the components bearing the actuating member associated with the control cam slide and the actuating member associated with it.

Such a height adjustment device with an associated vehicle seat is disclosed in the German patent publication DP 4335199. The seat bracket of the vehicle seat in this case comprises two support elements, coupled together to form a scissor-like structure, which alter their angular position when the height of the seat body changes, for example owing to a varying weight load. The change in angle is detected by two control valves, whose actuating members control cam slide down two curved control cam slides while performing an arcuate switching over movement and, if they are deflected sufficiently, cause compressed air to be supplied to the compressed air actuator or let off therefrom. Accordingly it is possible to ensure that the seat height is automatically set to the right height independently of weight.

Owing to their quite complex structure the known height adjustment devices appear to be in need of improvement. This also applies for alternative designs of height adjustment devices and the vehicle seats fitted with them, which are described in the German patent publications DE 19705010 A1, DE 3517503 C2 and DE 3517505 C2.

SUMMARY OF THE INVENTION

One object of the present invention is to provide a simply designed height adjustment device having compact dimensions and operating reliably for a vehicle seat and also a vehicle seat fitted with such a vehicle seat.

In the case of a height adjustment device of the type initially mentioned this aim is to be achieved by a design such that the relative switching over movement is a linear movement, the two components bearing the at least one control cam slide and the at least one actuating member are guided in the direction of the switching over movement relatively to one another in a linear manner.

The at least one control cam slide is in this case preferably arranged on a control carriage, which is a component of a linear unit, which furthermore comprises a guide body on which the control carriage runs by virtue of linear guide means in the direction of the switching over movement in a linear manner and which bears at least one actuating member for the control valve means.

The basic object is furthermore attained in conjunction with a vehicle seat of the type initially mentioned since the relative switching over movement is a linear movement, the component bearing the at least one control cam slide is a control carriage and the component bearing the associated actuating member constitute a guide body, on which the control carriage is mounted for linear motion in the direction of the switching over movement.

Consequently the operation of the control valve means is caused by simply produced linear movement between those components, which bear the control cam slide(s) and the at least one actuating member. The at least one control cam slide is more particularly located on a control carriage, which may be mounted for sliding motion using simple and economic linear guide means in order to cause the linear switching over movement with a high degree of precision. The linear movement mechanism is characterized furthermore by having small overall dimensions if required so that it is suitable for fitting to all commercially available vehicle seats. The height adjustment device is in principle suitable for any type of vehicle seat, although its main application is commercial vehicles, as for example trucks and tractors.

If the guide body, which is preferably present, bears not only the actuating member or members but also the control valve means itself, particularly compact dimensions are possible, all components being grouped together on a small space.

Optimum linear guidance is to be expected if the slide support means for the control carriage is arranged in a socket space in the guide body. The latter is then in particular tubular in design, the control carriage running along in its interior. For at least a part of its length the guide body may be longitudinally slotted so that for example a U-like or C-like cross section results. The linear guide means effective between the control carriage and the actuating member may, in particular when at least one of such components consists of plastic material, be directly constituted by faces of such components in engagement with each other in a manner allowing sliding.

Using suitable attachment means the actuating member and the control carriage can be secured to two suitable vehicle seat components, whose relative motion is employed to trigger the switching over movement. If it is a question in this case of relatively pivoting vehicle seat components, the attachment means for their part are preferably so designed that a pivoting attachment of the actuating body and the control carriage is possible on the respective vehicle seat component, which allows the linear switching over movement between the guide body and the control carriage. For instance pivoting holders may be employed.

In order to allow an individual adaptation of the seat height to suit the actual use, the control carriage is preferably in engagement with a setting lead screw means for threaded cooperation with it, the rotation of the setting lead screw changing the position of the control carriage in the direction of the switching over movement without having to vary the weight load on the seat body. The setting or lead screw may be provided with a drive, more particularly an electrical, one, for producing its rotary movement, such drive allowing operation with the aid of a conveniently located switch.

A construction is particularly advantageous in which a holder is fixed or able to be fixed on a vehicle seat component, and on which the setting lead screw is supported in a rotatable but axially fixed fashion and which may bear, preferably directly, an electrical drive for the production of the rotary movement. With the aid of a transmission an optimum adaptation of the speed of rotation may take place.

The threaded engagement between the control carriage and the setting lead screw is preferably designed with a self-locking action.

This means that the setting made can also be automatically held even without additional securing means.

In lieu of the setting lead screw another setting member may be employed, which causes the setting movement.

An individual adaptation of the seat height to suit the actual occupant may also be effected quite simply if the at least one actuating member is arranged on the guide body to allow adjustment in the direction of the switching over movement and can be locked in different positions. The above mentioned setting movement in this case consequently takes place between the guide body and the at least one actuating member.

Preferably the at least one actuating member is in this case seated on an adjustment carriage which is able to be shifted in the direction of the switching over movement while performing the setting movement linearly and is mounted so that it may be fixed in different positions.

The invention also contemplates the possibility of electrically activating the control valve means using suitably designed actuating members, as for example sensors. The technical complexity of the control means and also wear rate are however substantially less, if recourse is had to a mechanically operated control valve means, the at least one actuating member being mechanically engaged with the respectively associated control cam slide and running along same with an uninterrupted guiding contact.

The effect of transverse forces on the control valve means may be excluded or at least considerably reduced, if the actuating member (or members) are designed independently of the valve member of the respectively associated control valve and if the actuating members are, more particularly, rotatable rolling bodies, as for example balls.

The control valve means may comprise two mutually independently operated control valves, of which each is provided with its own control cam slide. Each control valve has in this case a particular actuating member assigned to it, by which it cooperates with one of the two control cam slides. The two control valves are more particularly in the form of 2/2 way valves.

A construction is more particularly compact in which the two control cam slides are juxtaposed on the two control carriage in parallelism to each other. This renders possible also a directly neighboring arrangement of the assigned control valves.

The guide body may have openings in its walls, through which the actuating members cooperate with the control cam slides. This is more especially advantageous when the control valves are mounted externally on one of the longitudinal sides of the guide body.

The two control cam slides may in area be restricted to a small portion of the control carriage, if owing to means preventing twisting of the control carriage the same relative orientation of the actuating members and the control cam slides is ensured at all times. The means preventing rotation may for example be engendered by mutually adapted rectangular cross sections of the control carriage and the guide body.

However a construction which presently is considered as being most advantageous is one in which the control valve means merely has one single control valve able in accordance with the position of switch to keep the degree of filling of the at least one compressed air actuator constant, to increase it or to reduce it. The position of switching is in this case set by a single control cam slide cooperating with the actuating member assigned to this single control valve. The control valve is here more especially in the form of a 3/3 way valve, possibly designed to allow continuous transitions between the three possible switching positions.

The control cam slide preferably has a non-linear configuration in the direction of the switching over movement and with laterally offset control cam slide portions so that the actuating member may be deflected in the course of the switching over movement athwart the direction thereof.

In the case of a single control valve it is a question more particularly of a flat spool valve. Its valve member designed as flat spool preferably consists of ceramic material to minimize wear, and more particularly also the mating body of the flat spool valve which is stationarily arranged, on which the valve member slide during changing its switching position. The switching movement then occurring of the valve member may admittedly be a pivoting movement in principal, but preferably it is linear.

For a driver to leave the cabin of a commercial vehicle it is an advantage if the seat body is temporarily lowered down below its normal height. For this purpose a venting valve may be present which allows the release of air from the at least one compressed air actuator bypassing the control valves.

The compressed air required for the operation of the device may be taken from the compressed air system present in any case in the motor vehicle. Furthermore there is however the possibility of fitting the height adjustment device itself directly with a compressed air producing means and/or a compressed air receiver. As a rule a small compressor will suffice to supply the necessary compressed air from time to time.

BRIEF DESCRIPTION OF THE DRAWINGS

In the following the invention will be described with reference to the accompanying drawings in detail.

DETAILED DESCRIPTION OF THE PREFERRED EMBODIMENTS

The vehicle seat generally referenced 1 is more particularly a commercial vehicle seat with its principal application in commercial vehicles such as trucks or tractors. It is characterized more particularly by performing automatic weight compensation at the respectively set seat height and it allows an individual setting of seat height and preferably also a rapid lowering to a comfortable position for getting on and off the seat.

The vehicle seat 1 comprises a seat body 2 with a bottom seat part 3 defining the seat area for the person using the vehicle seat, and a back rest 4. The seat body is installed on a seat bracket 5, which for its part is attached to a merely diagrammatically indicated vehicle component 6, as for example a frame part or on the chassis of the vehicle. A height adjustment device generally referenced 7 is integrated in the seat bracket 5 and renders possible setting to and maintaining the desired height. This height is freely selectable in accordance with the needs of the seat occupant.

Figure 9:
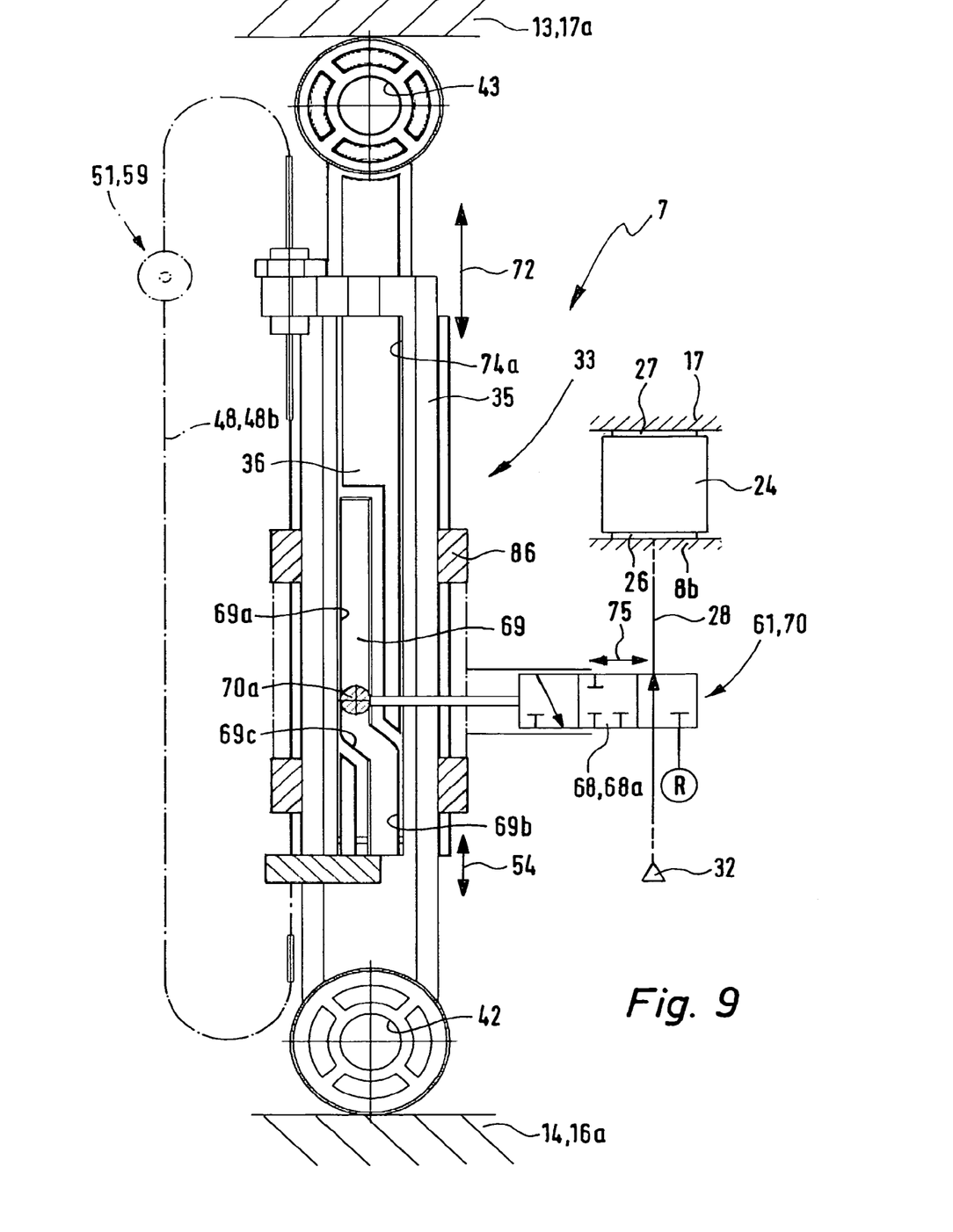
FIG. 9 shows the principal components of an alternative design of the height adjustment device of the invention partly diagrammatically and in section on the section line IX-IX of FIGS. 10 and 11.
Figure 10:
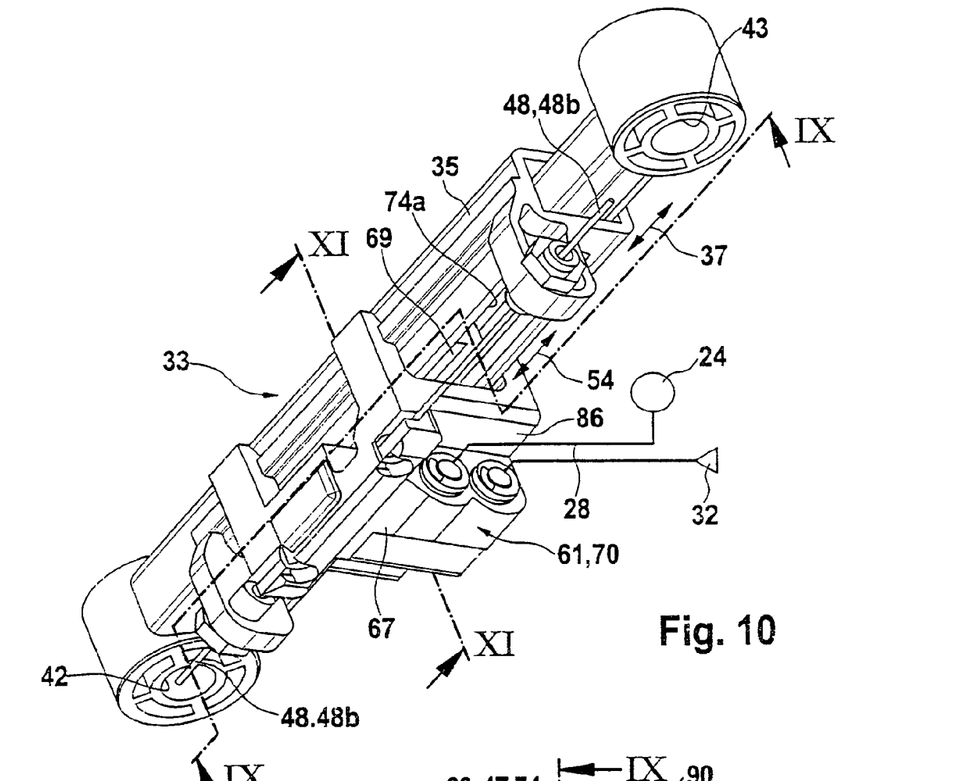
FIG. 10 shows the linear unit of the height adjustment device as in FIG. 9 as an individual representation.
Figure 11:
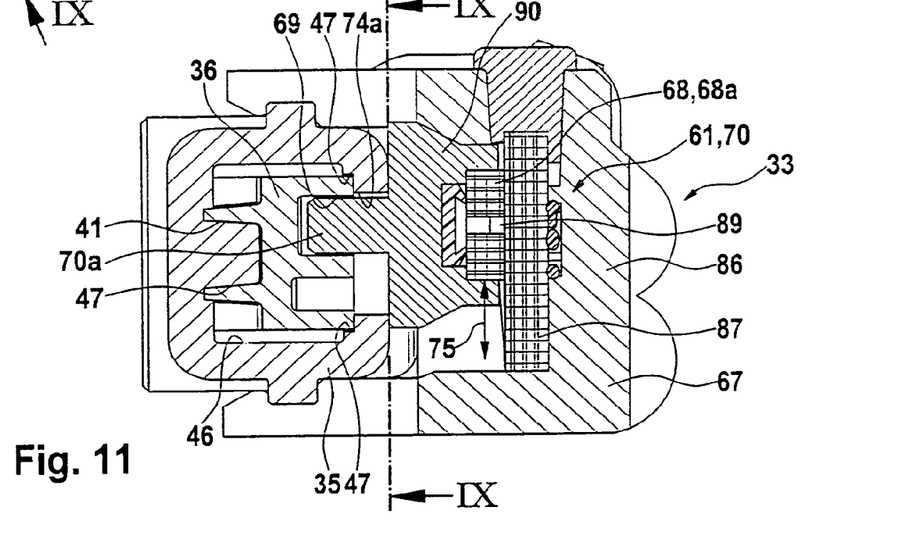
FIG. 11 is a cross section taken through the linear unit of FIG. 10 on the section line XI-XI.

FIGS. 2 through 8 on the one hand and FIGS. 9 through 11 on the other hand show in more detail two possible working examples of the height adjustment device 7. In the absence of any indication to the contrary the present description relates to both examples jointly.

The seat bracket 5 comprises a top holding structure 8a arranged at the bottom of the seat body 2 and a bottom holding structure 8b having the interface with the vehicle component 6. Between these two holding structures 8a and 8b there is a support structure 12, whose height may be set, with at least two support elements 13 and 14, which in accordance with an alteration in height of the seat body—in the following simply referred to as an "alteration in the seat height"—change the distance between them.

Figure 1:
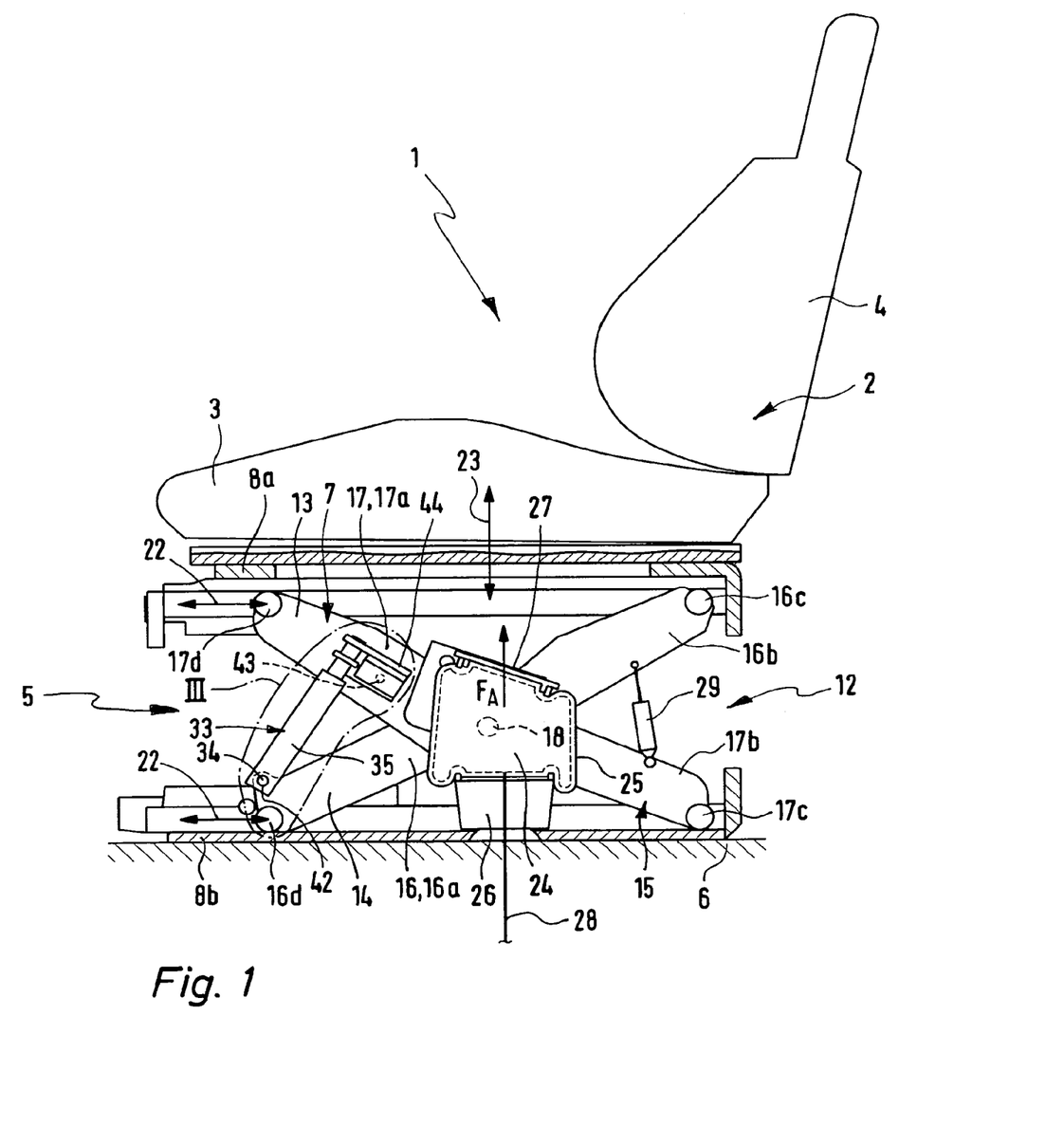
FIG. 1 shows a vehicle seat in accordance with the invention of preferred design which is fitted with a height adjustment device in accordance with the invention.
Figure 2:
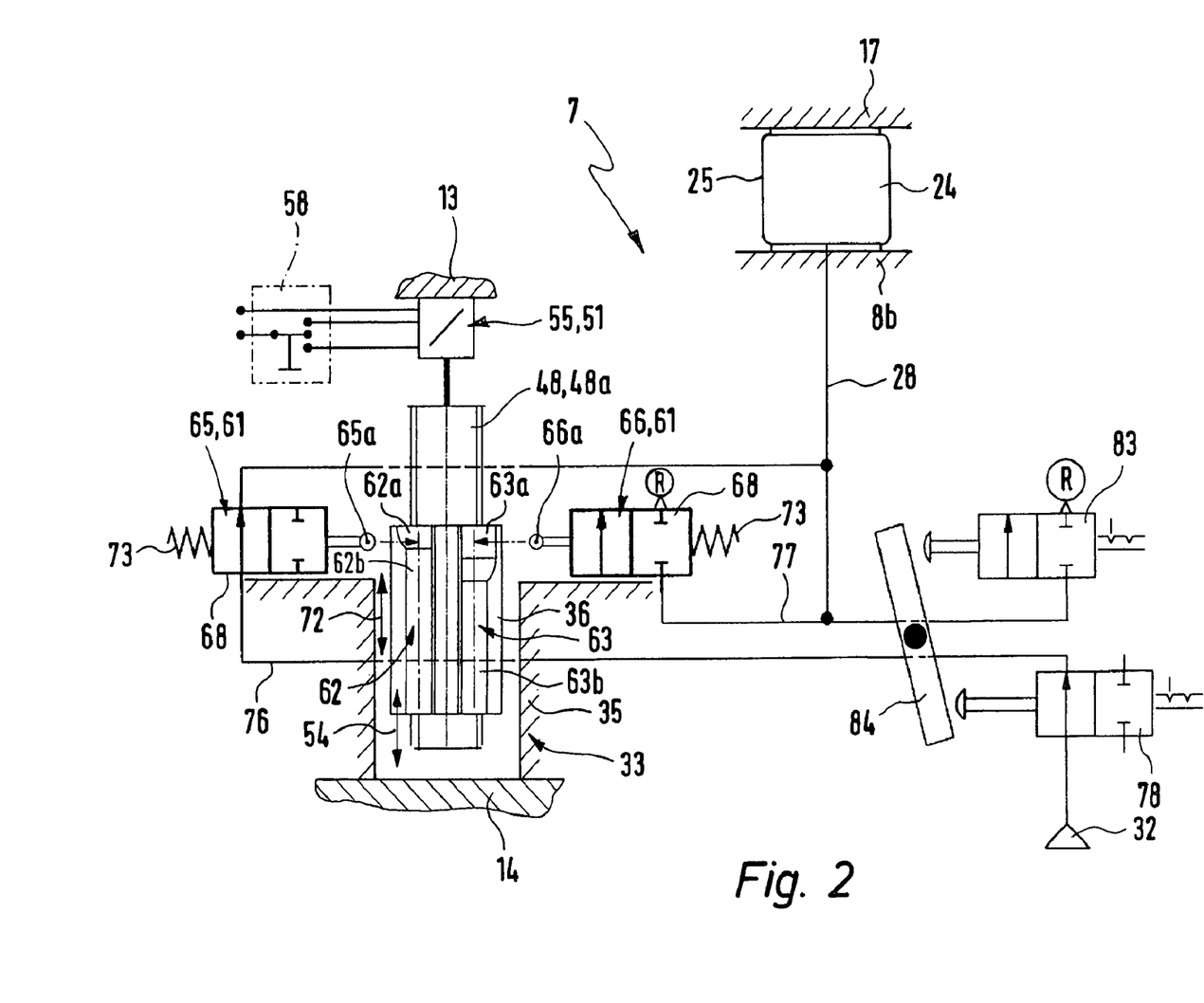
FIG. 2 shows the main components of the height adjustment device of the vehicle seat depicted in FIG. 1 mainly diagrammatically.
Figure 3:
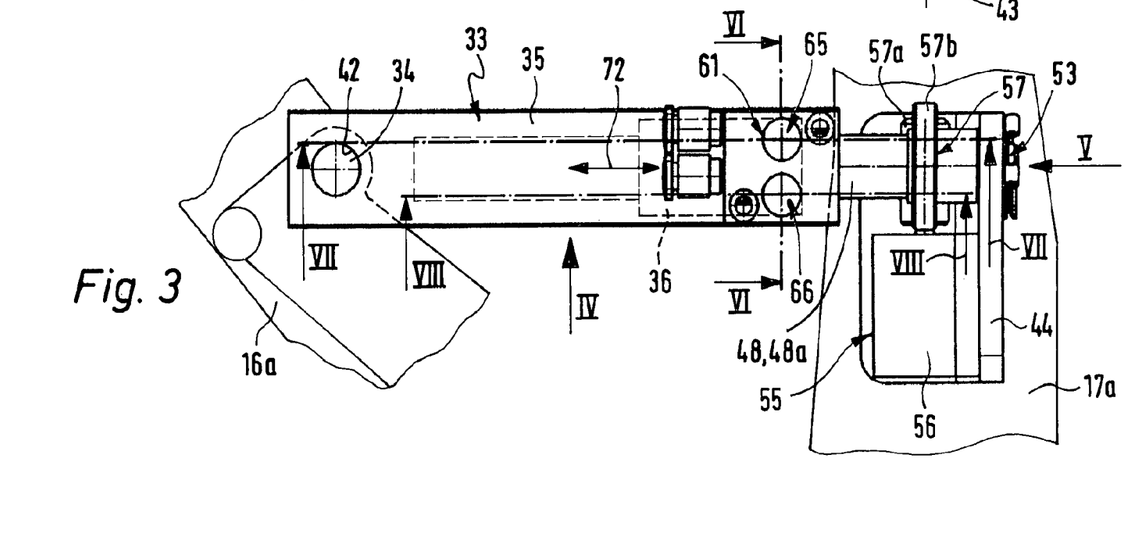
FIG. 3 shows the portion III surrounded in FIG. 1 by a frame on an greater scale to reveal inter alia an advantageous linear unit of the height adjustment device in plan view looking in the direction of the arrow IIIa in FIG. 4.
Figure 4:
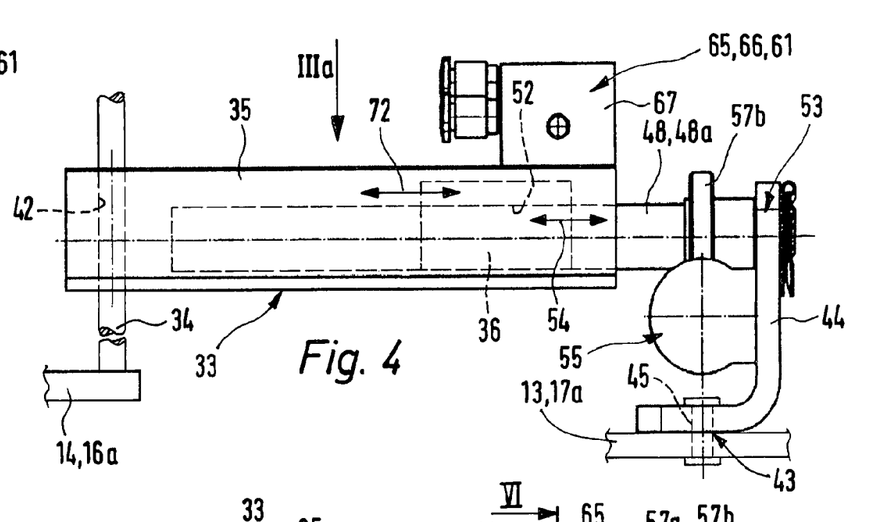
FIG. 4 shows the arrangement of FIG. 3 in a side elevation looking in the direction of the arrow IV.
Figure 5:
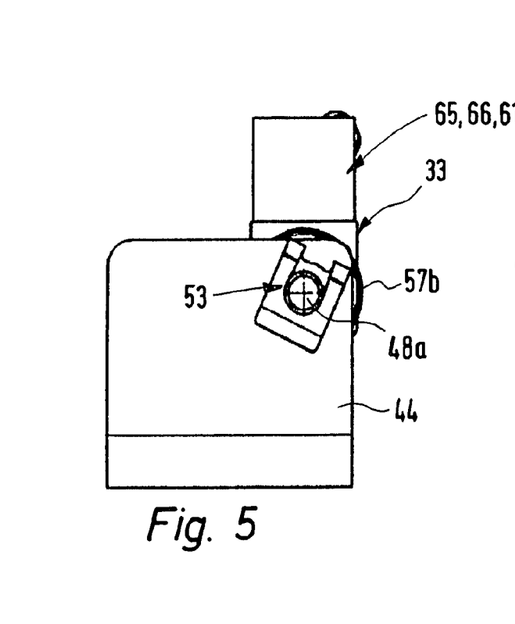
FIG. 5 represents the arrangement of FIG. 3 in an end-on view looking in the direction of the arrow V.

A support structure 12 in the form of a scissor structure is preferred having two scissor units 15 spaced apart in the transverse direction across the seat, of which only one is visible in FIG. 1. The other scissor unit lies above the of the drawing.

Each scissor unit 15 as considered in plan has two scissor arms 16 and 17 so pivoted for movement in relation to each other that they are capable of performing scissor movement in a vertical plane. Of the two scissor arm portions 16a and 16b and 17a and 17b of each scissor arm 16 and 17 lying on the one and the other side of the pivot bearing point 18 one respective scissor arm portion 16b and 17a is pivoted on the top holding structure 8a and the respectively other scissor arm portion 16a and 17b is pivoted on the bottom holding structure 8b. The pivoting, i.e. the mounting for a pivoting movement, of two superposed scissor arm portions 16b and 17b is at a purely rotary bearing means with suitable pivot bearings 16c and 17c. The two other scissor arm portions 16a and 17a are respectively so pivot mounted by way of bearing points 16d and 17d on the associated holding structure 8a and 8b that they are both pivotable with reference to same and also able to be reset in the position in the longitudinal direction of the seat as indicated by double arrows 22.

For the synchronization and mutual supporting action the scissor arms 16 and 17 of the two scissor units 15 are preferably connected with each other by way of connecting struts not illustrated in detail.

In the case of a height adjustment 23 as indicated by a double arrow the scissor arms 16 and 17 are respectively simultaneously pivoted about all bearing points 16c, 17c, 16d and 17d, the combined rotary and linear bearing points 16d and 17d performing the linear sliding movement 22. In this case the respectively superposed scissor arm portions 16a, 17a, 16b and 17b are either spread apart, namely on lifting the seat body 2, or on lowering the seat body 2 are moved together.

The movement for seat height adjustment 23 is caused by at least one compressed air actuator 24. Preferably only one such compressed air actuator 24 is present which is in particular a bellows actuator, whose interior space, able to be filled with compressed air, is delimited at least partly by a flexible, for example membrane-like wall 25 which may for example have a folding structure. The compressed air actuator 24 is more particularly placed between the two scissor units 15, it bearing against the bottom holding structure 8b by way of a lower carrying support structure 26 or directly on the vehicle component 6 and by way of a top carrying structure 27 (for example a support plate) so engaging the support structure 12 that it may exert a vertical lift force thereon. This feature is such in the working example that the top carrying structure 27 is attached to one of the scissor arms 17 of at least one scissor unit 15.

By way of a fluid control line 28 the compressed air actuator 24 can be supplied with compressed air or vented to reset to the desired degree of filling with compressed air. With an increase in the degree of filling the support force $F_A$ exerted by the compressed air actuator 24 on the seat body 2 directed vertically upward increases and with it the carrying capacity for a person with a corresponding weight using the seat body 2.

Owing to the compressible properties of the compressed air trapped in the compressed air actuator 24, preferably also amplified by the yielding effect of the flexible wall 25, the compressed air actuator 24 functions not only as a servo or setting member but also as a pneumatic spring, which in the direction of the seat height adjustment 23 provides for an elastic yielding effect in order to damp jerks occurring during travel of the vehicle. An optional shock absorber 29 mounted between at least two scissor arms 16 and 17 avoids uncontrolled trains of parasitic vibrations.

The compressed air for filling the at least one compressed air actuator 24 is supplied by a compressed air source 32, preferably belonging to the height adjustment device 7 and which can be mounted at some suitable position on the seat bracket 5. It may for example be an electrically actuated compressor for example, which is turned on from time to time. An extra compressed air receiver may also be provided. Furthermore there is the possibility of drawing the compressed air from a compressed air producing means and/or a compressed air receiver located on board for some other purpose.

The height adjustment device 7 ensures the maintenance of a set seat height irrespectively of the weight of the person actually occupying the seat body 2. Furthermore it is conveniently possible for the seat height to be individually varied.

For this purpose the height adjustment device 7 comprises a linear unit 33 which is placed intermediately between the two above mentioned support elements 13 and 14. These support elements 13 and 14 are preferably two identical superposed scissor arm portions 16a and 17a of two different scissor arms 16 and 17, both a direct and also an indirect kinematic coupling being possible. In the actual example here the limit unit 33 is at one end connected directly to the top scissor arm portion 17a, whereas the other end thereof is connected in a pivoting manner with a connecting strut 34 joining two scissor arm portions 16a of the two spaced apart scissor units 15 together.

Owing to this coupling to the two support elements 13 and 14 the linear unit 33 is operated in a manner dependent on the vertical motion and the seat height of the seat body and may cause corresponding regulating actions, which affect the degree of filling of the compressed air actuator 24.

Departing from the working examples it is also possible to employ two other components of the seat bracket 5 as support elements 13 and 14 whose distance apart may be varied and which are connected with the linear unit 33.

The linear unit 33 has a guide body 35 with a longitudinal extent and a control carriage 36 able to be shifted in the longitudinal direction of the guide body 35 thereon. The possible linear movement between the guide body 35 and the control carriage 36 is indicated by a double arrow 72 and in the following will be termed the switching over movement.

The guide body 35 is kinematically coupled by way of first attachment means 42 with the one, second support element 14. Second attachment means 43 are responsible for the kinematic coupling of the control carriage 36 with the other first support element 13. Accordingly the linear movement 72 will take place to the that degree and in that direction as is set by the relative motion between the two support elements 13 and 14. In order to ensure, despite the pivoting movement occurring between the two support elements 13 and 14 in relation to pivot bearing point 18, a proper linear relative movement the guide body 35 and the control carriage 36 the attachment means 42 and 43 are designed to render possible a pivoting movement of the guide body 35 and the control carriage 36 in relation to the assigned support elements 14 and 13, the planes of pivoting extending parallel to those of the scissor arms 16 and 17. In the working example here the first attachment means 42 have a transverse hole extending right through the guide body 35, through which the connecting strut 34, in the present case preferably cylindrical in form, runs and in which it is supported rotatably. Alternatively a holder, for example of U-like configuration, could also be pivotally linked, which for its part is fixed in a rotationally locked manner on the connecting strut 34. In accordance with the second working embodiment (FIGS. 9 through 11) the second attachment means 43 could be designed in the same way. In accordance with the first working embodiment (FIGS. 1 through 8) the second attachment means 43 could however also comprise a holder 44, preferably with an L-like shape, which is rotatably supported by means of a pin 45 on the scissor arm portion 17a and is stationarily held in other respects.

Preferably the control carriage 36 is received in a sliding fashion in a socket space 46 delimited by the guide body 35. The guide body 35 could for example, as is apparent from FIG. 11, have a U-cross section or a C-cross section along at least a part of its length. It is preferred to have an at least partially tubular configuration of the guide body 35.

The guide body 35 delimits a cavity or space, which constitutes the socket space 46 and may be open to the side along part of its length too. The control carriage 36 may consequently be surrounded by the guide body 35 for a major fraction of it periphery or even completely.

For the reasons still to be explained above it is an advantage, if the control carriage 36 is secured on the guide body 35 nonrotatably as regards the axis of the linear movement 72. This may be effected extreme simply if the cross section of the socket space 46 and that of the control carriage 36 depart from a circular shape and are more particularly rectangular, and preferably square in configuration. In this respect it may be a question of geometries which are complementary to each other.

As linear guide means 47 effective between the control carriage 36 and the guide body 35 it is possible to directly employ mutually facing faces of these two component. In the working example the control carriage 36 has its outer axis-parallel face sliding along the inner face of the socket space 46. Accordingly a simple but nevertheless effective sliding guiding effect is produced. Such a design is particularly suitable if the guide body 35 and/or the control carriage 36 consist of a low friction plastic material. In accordance with FIG. 11 interlocking guide portions 41 with a conical cross section may additionally employed to provide an accurate centering action.

However there is always the possibility of providing additional guide elements between the control carriage 36 and the guide body 35, be it to produce a sliding guiding action or to produce a rolling element guide means.

In the first working example the guide body 36 is not directly held on the holder 44 (and accordingly on the first support element 13) but with the aid of a stiff setting member 48. By way of the setting member 48 it is possible to set, in the direction of the linear movement 72, the relative position between the control carriage 36 and the first support element 13 bearing it in a variable manner and more particularly steplessly. The setting member 48 is more especially designed in the form of a strand.

It has turned out to be particularly satisfactory for the setting member 48 to be in the form of a setting lead screw 48a, which makes threaded engagement with the control carriage 36. In the working embodiment illustrated an adjustment lead screw 38a provided with a male thread fits through the control carriage 36 and accordingly engages its interlocking female thread 52 in threaded engagement, such thread being formed directly on the control carriage 36 or on a threaded element fixed on the control carriage 36. As indicated in the drawing the setting lead screw 48a may placed to a major extent in a protected manner inside the socket space 46.

At the end portion, opposite to the first attachment means 42, of the guide body 35 the adjustment lead screw 48c extends outward and it is supported in a rotatable fashion at a rotary bearing 53 on the holder 44 for turning about its longitudinal axis, while however at the same time being held to prevent axial shifting.

Turning the adjustment screwing 48a has the effect that the control carriage 36, which is prevented from rotating in relation to the guide body 35, performs a linear adjustment movement 54 in the longitudinal direction of the adjustment lead screw 48a and accordingly in relation to the first support element 13 bearing the control carriage 36. This adjustment movement 54 is irrespective of whether the two support elements 13 and 14 are currently moving relatively or not.

Therefore generally the guide body 35 and the control. carriage 36 perform, during a relative movement of the two support elements 13 and 14, the linear switching over movement 72 and there is furthermore the possibility, by performing the adjustment movement 54, of varying the position of the control carriage 36 in relation to the first support element 13.

In order to produce the rotary movement of the adjustment lead screw 48a the height adjustment device 7 includes a suitable drive means 51. The latter is in the example in the form of an electrical drive 55. It comprises more particularly an electric motor 56 which is drivingly connected with the adjustment lead screw 48a by way of a transmission, such transmission being more especially a worm transmission. A worm 57a connected in a torque-locked manner with the output shaft of the electric motor 56 meshes with a coaxially arranged worm wheel 57b torque-locked on the adjustment lead screw 48a. The transmission renders possible an optimum adaptation of speeds of rotation to suit the load occurring.

The electric motor 56 is put into operation using an electrical switch 58 able to be mounted adjacent to the driver's seat or in the vicinity of it in easy reach. Using the electrical switch 58 the motor may be caused to rotate clockwise or counter-clockwise in order to position the control carriage 36 in either direction. The overall arrangement is designed for a self-locking effect so that when the electric motor 56 is turned off the axial relative position between the adjustment lead screw 48a and the control carriage 36 will remain constant without the need for additional clamping means. More particularly, the screw threaded engagement between the adjustment lead screw 48a and the control carriage 36 is designed to be self-locking.

In lieu of a single electrical switch 58 several such switches may be present as well. It may be a question of at least one toggle switch or also of a rotary switch.

The electric motor 56 will more particularly be a stepper motor, whose output drive shaft is able to be set in different angular positions.

Instead of electrical operation plain manual operation of the adjustment lead screw 48a or some other alternative form of setting member would be possible. The setting member 48, as in the second working example, may also be in the form of a bowden cable 48b.

The control carriage 46 of the first working example is provided with first and second control cam slides 62 and 63 extending in the direction of the linear movement 72. These two control cam slides 62 and 63 preferably extend in a common plane and are preferably juxtaposed with a distance between them.

Figure 6:
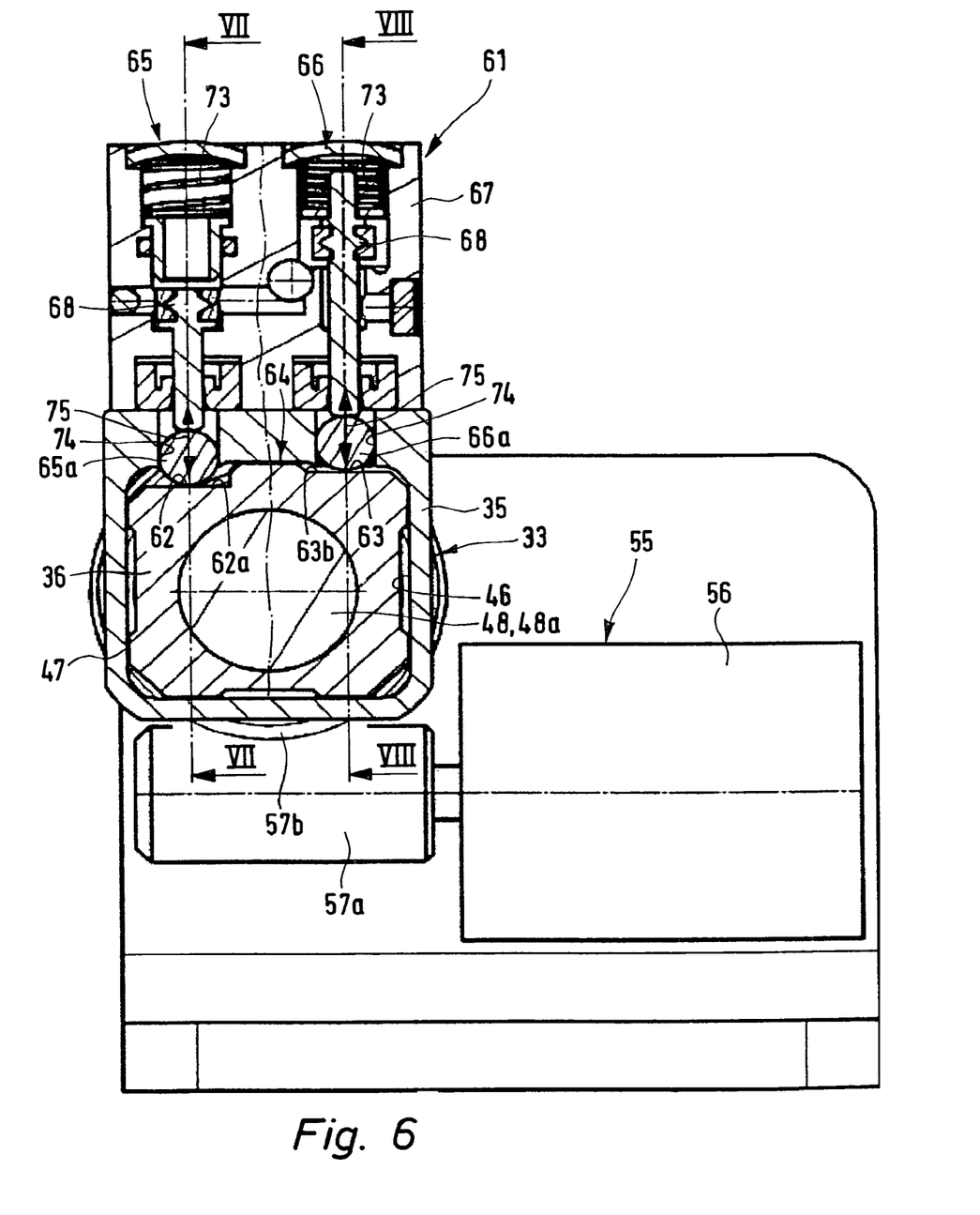
FIG. 6 is a cross section taken through the linear unit of FIG. 3 on the section line VI-VI, showing to the left of the middle plane marked in chained lines the condition apparent in FIG. 7 and to the to the right of such middle plane the condition apparent in FIG. 8.
Figure 7:
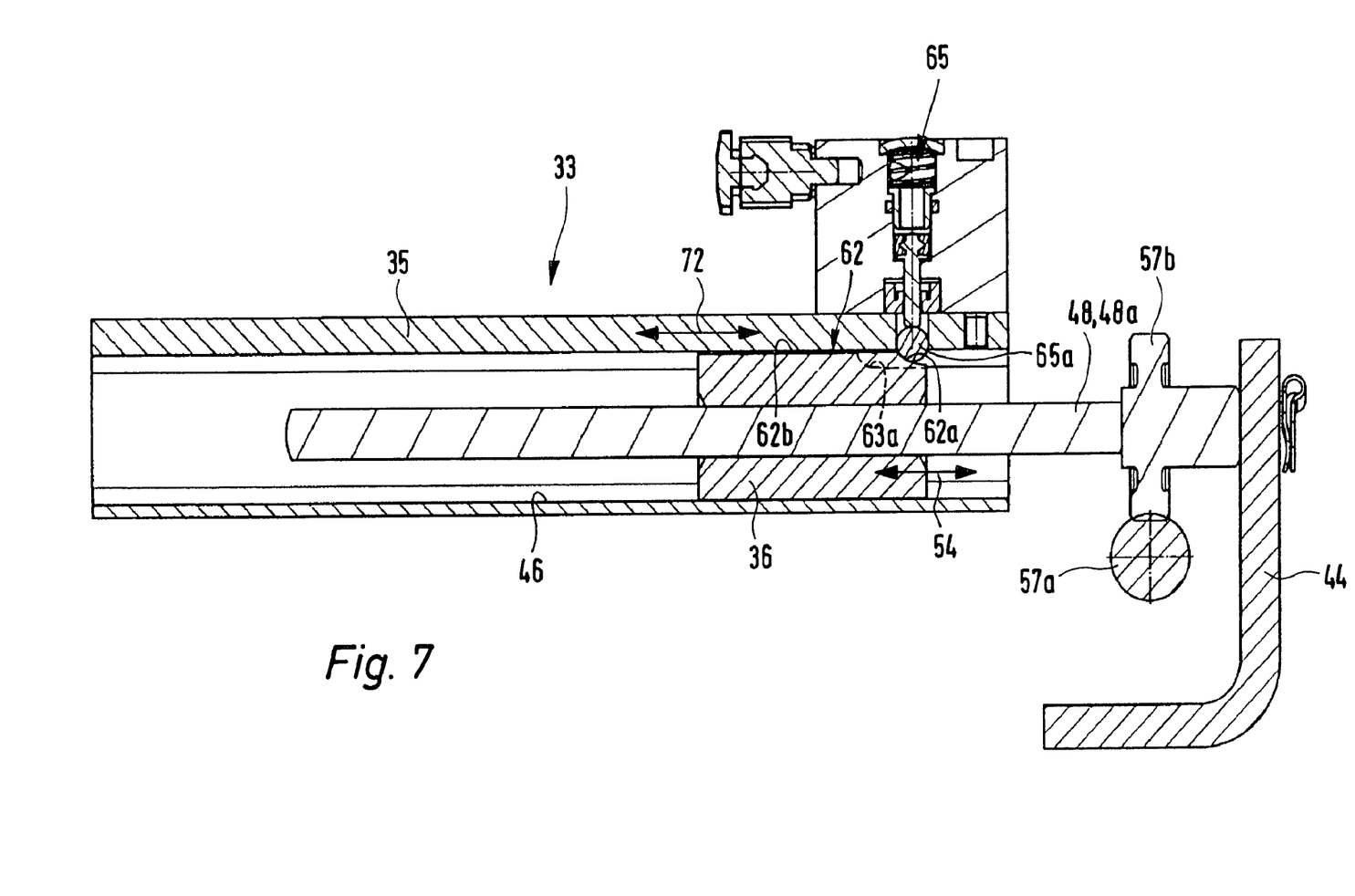
FIG. 7 is a longitudinal section taken through the linear unit on the section line VIII-VIII as in FIGS. 3 and 6.
Figure 8:
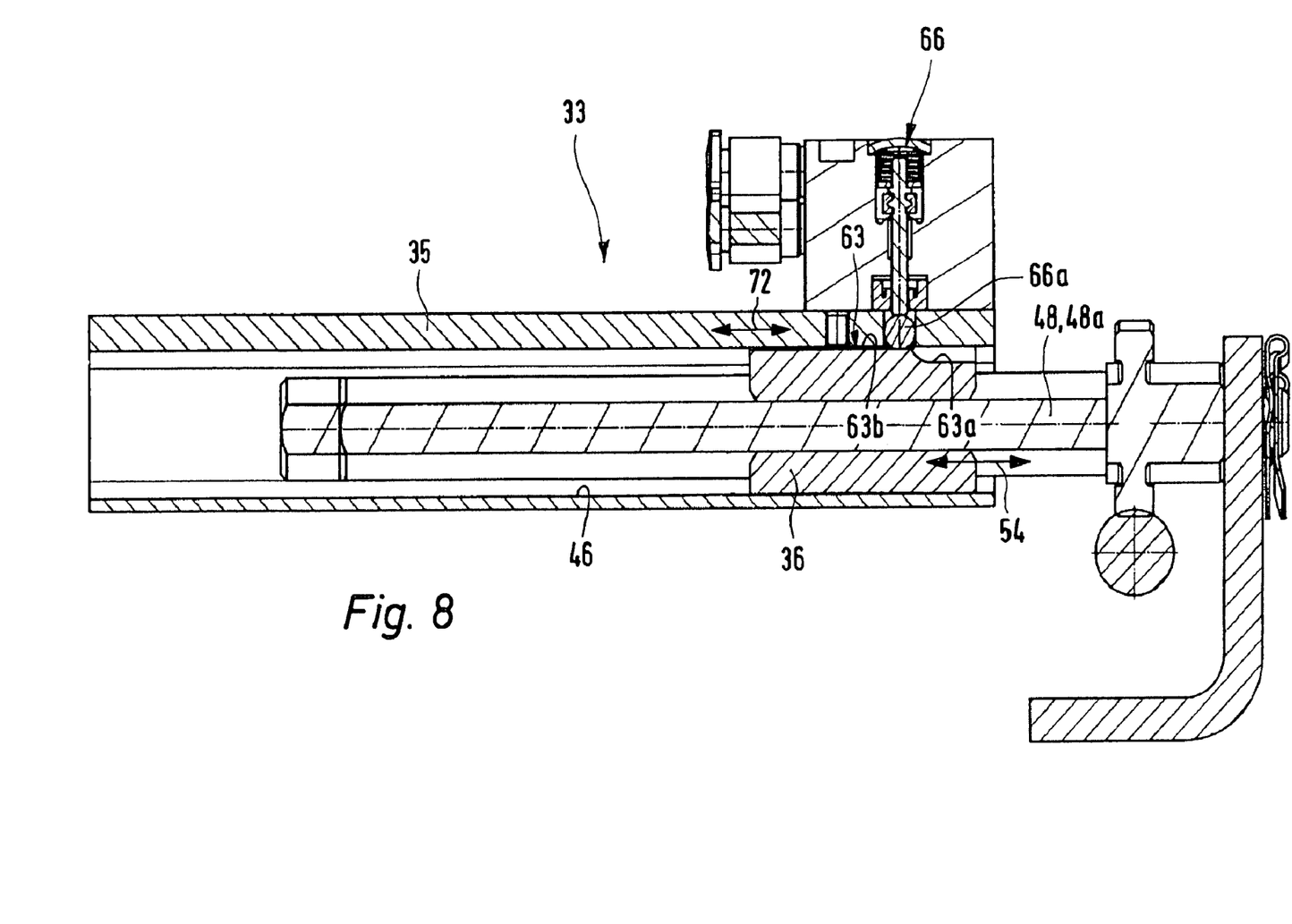
FIG. 8 is a longitudinal section taken on the section line VIII-VIII taken through the linear unit of FIGS. 3 and 6.

If the control carriage 36 possesses an essentially rectangular shape, it is and the same out axis-parallel outer face 64 of the control carriage 36 (FIG. 6).

In the second working embodiment illustrated in FIGS. 9 through 11 the control carriage is provided on its outer periphery with only one single control cam slide 69.

The control cam slides 62, 63 and 69 serve in both cases for the actuation of a control valve means 61 in a manner dependent on the relative position between the two support elements 13 and 14. The control valve means 61 may in principle be placed at any position, it preferably being located of the seat bracket 5 and more especially directly on the guide body 35.

Preferably the control valve means 61 is arranged to the side externally on the guide body 35. In this case it can have a valve housing 67 for all components in common.

In the case of the first working embodiment the control valve means 61 includes two separate control valves 65 and 66, each of them having its own control cam slide assigned to it.

These two control valves 65 and 66 are preferably 2/2 way valves, which may selectively assume an open position or a closed position, in which they shut off or allow the passage of air. To preset the current switching position each control valve 65 and 66 cooperates by way of an actuating member 65a and 66a with one of the control cam slides 62 and 63. Each control valve 65 and 66 is particularly associated with one of the control cam slides 62 and 63.

For each control valve 65 and 66 an actuating member 65a and 66a is provided which engages its particularly assigned control cam slide 62 and 63 of the control carriage 36. When a linear movement 72 takes place the actuating members 65a and 66a run along the control cam slides 62 and 63, it being possible for them to be spread out in accordance with the course of the control cam slides 62 and 63 athwart the direction of the linear movement 72 (deflection motion 75) in order to actuate the assigned control valve 65 and 66. The relative linear movement 72 between the control cam slide 36 and the guide body 35 is consequently a switching over movement 72 which is responsible for the spreading movement 75 and accordingly for the switch over of the control valves 65 and 66.

In the case of the control valves 65 and 66 it is preferably a question of mechanically operated structure. Their valve member 68 is in each case subject to the action of spring means 73 and thrusts the associated actuating member 65a and 66a against the assigned or cooperating control cam slide 62 and 63. During the switching over movement 72 the actuating members 65a and 66a may be deflected owing to the shape of the control cam slides 62 and 63 against spring force of the spring means 73 in order to shift the valve member 68 into the other switching position and to switch over the respective control valve 65 and 66.

The valve members 68 could act directly on the control cam slides 62 and 63. Then the actuating members would be directly constituted by the valve members 68. In order to reduce proneness to wear as actuating members 65a and 66a elements independent from the valve member 68 could be present, which are placed intermediately in each case between a valve member 68 and the associated control cam slide 62 and 63. Preferably in this case it is a question of rolling elements or anti-friction bearing means, which are able to roll along cam faces on the control cam slides 62 and 63.

The actuating members 65a and 66a cooperate with the control cam slides 62 and 63 through openings 74 in the wall of the guide body 35. In such wall openings 74 the actuating members 65a and 66a are fixed in position so that they can only perform the spreading or deflecting movements 75 necessary for the operation of the valve member 68 which are in a plane at a right angle to the direction of the switching over movement 72.

To cause the spreading movements 75 the two control cam slides 62 and 63 of the first working embodiment possess an initially recessed portion 62a and 63a and a proud portion or raised portion 62b and 63b adjoining it. If in the course of a switching over movement 72 a recessed portion 62a and 63a is at the same level as an actuating member 65a and 66a, the associated control valve 65 and 66 will assume its home position. If an actuating member 65a and 66a on the other hand lies on a raised or proud portion 62b and 63b of a control cam slide 62 and 63, the respective control valve 56 and 66 will be in its second position. The length, as measured in the direction of the switching over movement 72, in the two recessed portions 62a and 63a is not the same with the result that the control valves 65 and 66 will be switched over into the second position in the case of different relative positions of the guide body 35 unit control carriage 36.

The first control valve 65 cooperating with the shorter recessed portion 62a is placed on a first fluid duct 76, which connects the compressed air source 32 with the fluid control line 28. Its home position is the open position, and the second position is the closed position.

The second control valve 66 is placed on a second fluid duct 77 which is able to connect the fluid control line 28 with the atmosphere R. In this case the home position is the closed position, in which the atmosphere is shut off. In the second switching position the fluid connection is turned on so that the fluid control line 28 is opened.

The arrangement is so designed that during use of the vehicle seat 1 with the support elements 13 and 14 moving apart firstly the recessed portion 62a and 63a and only afterward firstly the raised portion 62b and 63b of the respective control cam slide 62 and 63 cooperates with the assigned actuating member 65a and 66a.

In the initial position the guide body 35 and the control carriage 36 assume a relative position in which the actuating members 65a and 66a are clear of the control cam slides 62 and 63 or are at the recessed portions 62a and 63a. If in this state a supply valve 78 is opened, which is placed between the compressed air source 32 and the first control valve 65, compressed air will flow by way of the first fluid duct 76 and the (first control valve 65 into the compressed air actuator, which accordingly lifts the seat body 2. The second control valve 66 is located in this case in the closed position. A discharge valve 83 is also closed which can in the case of need connect the fluid control line 28 with the atmosphere R irrespectively of the second control valve 66.

During lifting the seat body 2 the two support elements 13 and 14 spread apart, this causing the switching over movement 7s to take place, which the actuating members 65a and 66a run along the control cam slides 62 and 63 assigned to them.

The lifting movement comes to an end when the actuating member 65a of the first control valve 65 has shifted from the recessed portion 62a and moved into the proud portion 62b of the first control cam slide 62. The first control valve 65 is accordingly switched over into the closed position and the volume of air in the compressed air actuator 24 is trapped. The actuating member 66a of the second control valve 66 is then still located in the associated recessed portion 63a, which has a greater longitudinal extent than the recessed portion 62a of the first control cam slide 62.

In this operational state the remaining length of the recessed portion 63a of the second control cam slide 63 is available for the springing movement of the seat body 2. As long as the seat body 2 is only displaced to this extent, the control valves 65 and 66 will continue to dwell in their assumed positions and the compressed air actuator 24 will function as a pneumatic spring.

If then some heavy bodied person seats himself on the seat body 2, the height adjustment device 7 will nevertheless regulate the seat height automatically to the previously set height. The reason for this is that in this case owing to the moving together of the support elements 13 and 14 the original switching position of the control valves 65 and 66 will be resumed and the compressed air actuator 24 will be topped up with compressed air until the original seat height has been restored.

If then again there is a reduction in weight the seat body 2 will move upward furthermore owing to the overwhelming setting force of the compressed air actuator 24, the support elements 13 and 14 being spread apart further. As a consequence the first control valve 65 will admittedly dwell in the closed state owing to contact with the proud portion 62b, but however it will switch the second control valve 66 into the open position or, respectively, the venting position, because its actuating member 66a will come to lie on the proud portion 63b. This state will remain until owing to venting occurring through the second control valve 66 of the compressed air actuator 24 its servo force is so far reduced that the seat body 2 is relowered to the originally set height.

In the case of the second working example (FIGS. 9 through 11) the control valve means 61 only comprises one single control valve 70 which is in a position to maintain the degree of filling of the compressed air actuator constant, to increase it or to reduce it. The respective switching position is set or predetermined by the in this case single control cam slide 69 of the control carriage 35, which cooperates with a single actuating member 70a assigned to the control valve 70.

The single control cam slide 69 extends in the direction of the switching over movement 72 but it possesses a non-linear longitudinal shape. A first linear cam portion 69a is transversely offset in relation to an axially spaced second linear cam portion 69b and is joined with it with the aid of an obliquely extending and preferably also linear transition portion 69c. The actuating member 70a fitting into the single control cam slide 69 is accordingly urged athwart the direction of the switching over movement 72, when it runs along the control cam slide 69 and changes over from the first to the second cam portion 69a and 69b.

The displacement movement 75 then occurring of the actuating member 70a directly entails a change in the switching position of the valve member 68, which in the present case is preferably in the form of a flat spool 68a. The single control valve 70 is preferably a flat spool valve, The control cam slide 69 is preferably groove-like the actuating member 70a being guided by the two groove flanks. The displacement movement 75 is accordingly aligned in the groove cross section. In the first working embodiment the control cam slides 62 and 63 are also groove-shaped in configuration and here the presetting for the displacement movement 75 is however produced by the respective groove floor with the result that the displacement movement 75 is orientated in the height direction of the groove. Both designs may furthermore be employed in the case of the two working examples.

The flat spool 68a rests against a flat face of a mating body 87 and comprises several control ducts 89, of which in FIG. 11 merely one is visible. Dependent on the switching position of the valve member 68 (here the flat spool 68a) such control ducts 89 in cooperation with further control ducts, not illustrated, of the mating body 87 provide for the above mentioned switching functions for the control of the compressed air actuator 24. For minimizing friction and wear the flat spool 68a and its mating body 87, which is stationary in relation to the guide body 35, are preferably fashioned of a ceramic material.

The displacement movement 75 of the actuating member 70a could be a pivotal movement, if the actuating member 70a were to be pivotally supported on the guide body 35. Preferably it is a question however of a plain linear movement, preferably athwart the direction of the switching over movement 72. The actuating member 70a may be fixed on a slide element 90 mounted in a sliding means and able to move in the direction of the displacement movement 72, and it may bear the valve member 68 or even directly constitute it.

The control valve 70 of the second working example is a 3/3 way valve combing the function of the two 2/2 way valves 65 and 66 of the first working embodiment in one. It is placed on the fluid control line 28 and connects the compressed air actuator 24 with the compressed air source as long as the actuating member 70a is located in the first cam portion 69a illustrated at the top in FIG. 9, and it vents the compressed air actuator 24 to the atmosphere as long as the actuating member 70a is located in the second cam portion 69b lying at the bottom in FIG. 9. Should the actuating member 70a be in the transition portion 69c, the compressed air actuator 24 will be separated both from the compressed air source 32 and also from the atmosphere as well. The regulation proceedings are then the same as those explained with reference to the first working embodiment.

In the second working embodiment the control valve means 61 is preferably not secured directly on the guide body 35 but rather on an adjustment carriage 86 able to be linearly slid on the guide body 35 in the direction of the switching over movement 72 to perform an adjustment movement 54 and able to be locked in different positions. Owing to the alteration in the relative position between the adjustment carriage 86 and the guide body 35 the relative position between the guide body 35 and the 70a is consequently modified with the result that the desired height of the seat body 2 may be affected. This means that practically the seat height at which the actuating member 70a is located in the transition portion 6c of the control cam slide 69 is set.

If the control valve means 61 is externally arranged, the actuating member 70a will in any case on the adjustment carriage 86.

The actuating member 70a may fit through a slot-like wall opening 74a f. i., extending in the direction of the switching over movement 72, in the guide body 35 in order to cooperate with the control cam slide 69.

To alter the relative position between the adjustment carriage 86 and the guide body 35 setting member 48 is preferably again present which can be designed in the fashion elucidated in connection with the first embodiment of the invention. FIGS. 9 and 10 show a design in the form of a bowden cable 48b. For the actuation a suitable drive device 51 is present, which again may be designed for mechanical or however for manual operation, for example using a hand wheel 59.

The desired height of the seat body 2 may be reset in both working example by activation of the respective setting member 48. This means that relative position, applying for a certain weight load, between the control carriage 36 bearing the control cam slides 62, 63 and 69 and the guide body 35 changes so that the control mechanisms just described are moved toward a higher level or to a lower level. Irrespectively what height is set by operation of the setting member 48, the height of the seat body 2 will reset in a weight dependent manner to this height.

In order to facilitate getting on and off the seat body 2 the compressed air actuator 24 can be rapidly vented independently of the position of the second control valve 66 by a switch over of the discharge valve 83, which can also be included in the second working embodiment of the invention, into the open position.

Preferably there is a switch device 84 by which the supply valve 78 and the discharge valve 83 can be simultaneously operated in a predetermined manner. This renders possible a linking of the switching states of such valves 78 and 83 in such a manner that they assume the open position and the closed position oppositely to each other. If consequently the discharge valve 83 is opened, the supply valve 78 will simultaneously switch off the supply of fluid to the control line 28 and vice versa.

In summary it may be stated in connection with the working embodiments of the invention that a control carriage 36 supported for linear motion on a guide body 35 controls by means of at least one control cam slide 62, 63 and 69 a control valve means 61, which governs the degree of filling of at least one compressed air actuator 24, which in turn is in control of the seat height. A setting member 48 renders possible in this case a variable resetting of height.

The invention claimed is:

1. A height adjustment device of a vehicle seat, which comprises a control valve means able to be switched over between different states of operation for governing the degree of filling of at least one compressed air actuator holding the seat body at a desired height and thereby providing an elastic supporting action in a vertical direction, at least one actuating member cooperating with at least one control cam slide being associated with the control valve means in such a manner that in accordance with use dependent alteration of the weight to be borne by the at least one compressed air actuator a relative movement causing the switching over of the control valve means takes place between a component bearing the at least one control cam slide and another component bearing the associated actuating member, wherein the relative movement is a linear movement wherein the component bearing the at least one control cam slide and the component bearing the at least one actuating member are guided in the direction of the relative movement relatively to one another in a linearly slidable manner, and wherein the at least one control cam slide is arranged on a control carriage which is a component of a linear unit which also comprises a guide body, the control carriage being guided on the guide body by linear guide means for linear movement in the direction of the relative movement, and the guide body bearing the at least one actuating member for the control valve means.

2. The device as set forth in claim 1, wherein the guide body bears the control valve means.

3. The device as set forth in claim 1, wherein the guide body delimits a socket space in which the control carriage is arranged in a slidable manner.

4. The device as set forth in claim 3, wherein the guide body is tubular, its inner space defining the socket space.

5. The device as set forth in claim 3, wherein the socket space and the control carriage have a mutually matching non-circular cross section.

6. The device as set forth in claim 1, wherein the control carriage and the guide body are mounted together in a manner avoiding relative rotation.

7. The device as set forth in claim 1, wherein the guide body and the control carriage have attachment means assigned to them, which serve for the attachment to vehicle seat components moving closer together or moving apart in the course of alteration of the height of a carried seat body.

8. The device as set forth in claim 7, wherein the attachment means render possible a pivotal connection with the associated vehicle seat component.

9. The device as set forth in claim 1, wherein the control carriage is arranged on a setting member by whose operation the control carriage is able to be reset in the direction of the relative movement by performing an adjustment movement in order to change the height desired for the seat body.

10. A height adjustment device of a vehicle seat, which comprises a control valve means able to be switched over between different states of operation for governing the degree of filling of at least one compressed air actuator holding the seat body at a desired height and thereby providing an elastic supporting action in a vertical direction, at least one actuating member cooperating with at least one control cam slide being associated with the control valve means in such a manner that in accordance with use dependent alteration of the weight to be borne by the at least one compressed air actuator, a relative movement causing the switching over of the control valve means takes place between a component bearing the at least one control cam slide and another component bearing the associated actuating member, wherein the relative movement is a linear movement wherein the component bearing the at least one control cam slide and the component bearing the at least one actuating member are guided in the direction of the relative movement relatively to one another in a linearly slidable manner, and  wherein the control carriage is arranged on a setting member by whose operation the control carriage is able to be reset in the direction of the relative movement by performing an adjustment movement in order to change the height desired for the seat body, and  wherein the setting member is designed in the form of a setting lead screw which screwingly engages the control carriage and by rotating actuation of which the control carriage is able to be linearly shifted to execute the adjustment movement.

11. The device as set forth in claim 10, wherein the threaded engagement between the control carriage and the setting lead screw is designed with a self-locking action.

12. The device as set forth in claim 10, wherein a holder is present fixed or able to be fixed to a vehicle seat component, on which holder the setting lead screw is supported in a manner allowing rotation but preventing axial movement.

13. The device as set forth in claim 12, wherein an electrical drive is assigned to the setting member for its operation wherein the holder bears the electrical drive.

14. The device as set forth in claim 9, wherein an electrical drive is assigned to the setting member for its operation.

15. The device as set forth in claim 14, further comprising at least one manually operated electrical switch for the activation of the electrical drive causing the adjustment movement.

16. The device as set forth in claim 14, wherein the electrical drive comprises an electric motor and a transmission.

17. The device as set forth in claim 1, wherein the at least one actuating member is arranged in an adjustable manner on the guide body for performing a resetting movement in the direction of the relative movement and can be set in the different positions, in order to be able to modify the desired height of the seat body by an alteration of the relative position between the at least one actuating member and the guide body.

18. The device as set forth in claim 17, wherein the at least one actuating member is arranged on an adjustment carriage, said adjustment carriage being able to be linearly shifted with regard to the guide body in the direction of the relative movement while performing the adjustment movement and being able to be held in different positions.

19. The device as set forth in claim 18, wherein the control valve means is arranged on the adjustment carriage.

20. The device as set forth in claim 18, wherein a setting member engages the adjustment carriage by whose operation the adjustment carriage may be adjusted in the direction of the relative movement in relation to the guide body.

21. A height adjustment device of a vehicle seat, which comprises a control valve means able to be switched over between different states of operation for governing the degree of filling of at least one compressed air actuator holding the seat body at a desired height and thereby providing an elastic supporting action in a vertical direction, at least one actuating member cooperating with at least one control cam slide being associated with the control valve means in such a manner that in accordance with use dependent alteration of the weight to be borne by the at least one compressed air actuator, a relative movement causing the switching over of the control valve means takes place between a component bearing the at least one control cam slide and another component bearing the associated actuating member, wherein the relative movement is a linear movement wherein the component bearing the at least one control cam slide and the component bearing the at least one actuating member are guided in the direction of the relative movement relatively to one another in a linearly slidable manner, and  wherein the at least one actuating member is arranged in an adjustable manner on the guide body for performing a resetting movement in the direction of the relative movement and can be set in the different positions, in order to be able to modify the desired height of the seat body by an alteration of the relative position between the at least one actuating member and the guide body, and  wherein the at least one actuating member is arranged on an adjustment carriage, said adjustment carriage being able to be linearly shifted with regard to the guide body in the direction of the relative movement while performing the adjustment movement and being able to be held in different positions, and  wherein a setting member engages the adjustment carriage by whose operation the adjustment carriage may be adjusted in the direction of the relative movement in relation to the guide body, and  wherein the setting member is in the form of a bowden cable.

22. A height adjustment device of a vehicle seat, which comprises a control valve means able to be switched over between different states of operation for governing the degree of filling of at least one compressed air actuator holding the seat body at a desired height and thereby providing an elastic supporting action in a vertical direction, at least one actuating member cooperating with at least one control cam slide being associated with the control valve means in such a manner that in accordance with use dependent alteration of the weight to be borne by the at least one compressed air actuator, a relative movement causing the switching over of the control valve means takes place between a component bearing the at least one control cam slide and another component bearing the associated actuating member, wherein the relative movement is a linear movement wherein the component bearing the at least one control cam slide and the component bearing the at least one actuating member are guided in the direction of the relative movement relatively to one another in a linearly slidable manner, and  wherein the at least one actuating member is arranged in an adjustable manner on the guide body for performing a resetting movement in the direction of the relative movement and can be set in the different positions, in order to be able to modify the desired height of the seat body by an alteration of the relative position between the at least one actuating member and the guide body, and  wherein the at least one actuating member is arranged on an adjustment carriage, said adjustment carriage being able to be linearly shifted with regard to the guide body in the direction of the relative movement while performing the adjustment movement and being able to be held in different positions, and wherein a setting member engages the adjustment carriage by whose operation the adjustment carriage may be adjusted in the direction of the relative movement in relation to the guide body, and wherein a manual or power drive means is assigned to the setting member for the actuation thereof.

23. The device as set forth in claim 22, wherein an electrical drive or a hand wheel is provided as the drive means.

24. The device as set forth in claim 1, wherein the control valve means is designed for mechanical activation, the at least one actuating member being engaged with and running along the assigned control cam slide in the course of the switching over movement.

25. A height adjustment device of a vehicle seat, which comprises a control valve means able to be switched over between different states of operation for governing the degree of filling of at least one compressed air actuator holding the seat body at a desired height and thereby providing an elastic supporting action in a vertical direction, at least one actuating member cooperating with at least one control cam slide being associated with the control valve means in such a manner that in accordance with use dependent alteration of the weight to be borne by the at least one compressed air actuator, a relative movement causing the switching over of the control valve means takes place between a component bearing the at least one control cam slide and another component bearing the associated actuating member, wherein the relative movement is a linear movement wherein the component bearing the at least one control cam slide and the component bearing the at least one actuating member are guided in the direction of the relative movement relatively to one another in a linearly slidable manner, and wherein the at least one actuating member is arranged in an adjustable manner on the guide body for performing a resetting movement in the direction of the relative movement and can be set in the different positions, in order to be able to modify the desired height of the seat body by an alteration of the relative position between the at least one actuating member and the guide body, and wherein the at least one actuating member is arranged on an adjustment carriage, said adjustment carriage being able to be linearly shifted with regard to the guide body in the direction of the relative movement while performing the adjustment movement and being able to be held in different positions, and wherein a setting member engages the adjustment carriage by whose operation the adjustment carriage may be adjusted in the direction of the relative movement in relation to the guide body, and wherein the at least one actuating member is constituted by a rolling body which is arranged in a rotatable manner between the assigned control cam slide and a valve member of the control valve means.

26. The device as set forth in claim 1, wherein a discharge valve is present rendering possible venting of the at least one compressed air actuator bypassing the control valve means.

27. A height adjustment device of a vehicle seat, which comprises a control valve means able to be switched over between different states of operation for governing the degree of filling of at least one compressed air actuator holding the seat body at a desired height and thereby providing an elastic supporting action in a vertical direction, at least one actuating member cooperating with at least one control cam slide being associated with the control valve means in such a manner that in accordance with use dependent alteration of the weight to be borne by the at least one compressed air actuator, a relative movement causing the switching over of the control valve means takes place between a component bearing the at least one control cam slide and another component bearing the associated actuating member, wherein the relative movement is a linear movement wherein the component bearing the at least one control cam slide and the component bearing the at least one actuating member are guided in the direction of the relative movement relatively to one another in a linearly slidable manner, and wherein the control valve means includes two control valves each with its own control cam slide assigned to it.

28. The device as set forth in claim 27, wherein the two control cam slides are arranged on the control carriage in a juxtaposed manner in longitudinal parallelism.

29. The device as set forth in claim 27, wherein the two control cam slides are arranged in a juxtaposed manner athwart the direction of the switching over movement.

30. The device as set forth in claim 29, wherein the two control cam slides are essentially coplanar.

31. The device as set forth in claim 27, wherein the at least one actuating member of the control valve means cooperates through at least one wall opening in the guide body with the respectively assigned control cam slide.

32. The device as set forth in claim 1, wherein the control valve means has a single control valve which dependent on the position of switching is able to keep the degree of filling of the at least one compressed air actuator constant, to increase it or to reduce it, the position of switching being predetermined by a single control cam slide, which cooperates with an actuating member assigned to this control valve.

33. A height adjustment device of a vehicle seat, which comprises a control valve means able to be switched over between different states of operation for governing the degree of filling of at least one compressed air actuator holding the seat body at a desired height and thereby providing an elastic supporting action in a vertical direction, at least one actuating member cooperating with at least one control cam slide being associated with the control valve means in such a manner that in accordance with use dependent alteration of the weight to be borne by the at least one compressed air actuator, a relative movement causing the switching over of the control valve means takes place between a component bearing the at least one control cam slide and another component bearing the associated actuating member, wherein the relative movement is a linear movement wherein the component bearing the at least one control cam slide and the component bearing the at least one actuating member are guided in the direction of the relative movement relatively to one another in a linearly slidable manner, and wherein the control valve means has a single control valve which dependent on the position of switching is able to keep the degree of filling of the at least one compressed air actuator constant, to increase it or to reduce it, the position of switching being predetermined by a single control cam slide, which cooperates with an actuating member assigned to this control valve, and wherein the control cam slide extends on the control carriage in a non-linear fashion in the direction of the relative movement with the result that the actuating member is displaced on running along in the control cam slide athwart the direction of the relative movement.

34. The device as set forth in claim 33, wherein the single control valve is a flat spool valve and as a valve member it has a flat spool able to slide athwart the direction of the relative movement, such spool being actuated by the assigned actuating member.

35. The device as set forth in claim 34, wherein the flat spool and its mating body stationarily arranged in relation to the guide body of the control valve consist of ceramic material.

36. A vehicle seat comprising a seat body, which is arranged on a seat bracket having a height adjustment device and having a control valve means able to be switched over between different states of operation and at least one compressed air actuator by which the seat body is able to be positioned at different heights and is able to be resiliently vertically maintained on the respectively set height, the seat bracket having at least two support elements varying the distance between them during vertical movement of the seat body, one support element having at least one control cam slide kinematically coupled with it, such control cam slide so cooperating with at least one actuating member kinematically coupled with the other support element and assigned to the control valve means for the control of the degree of filling of the at least one compressed air actuator that following a use dependent alteration of the weight carried by the at least one compressed air actuator there is a relative movement between the component bearing the at least one control cam slide and the component bearing the actuating member assigned thereto, the relative movement causing a switch over of the control valve means, wherein the relative movement is a linear movement wherein the component carrying the at least one control cam slide is a control carriage and the component carrying the assigned actuating member constitutes a guide body whereon the control carriage is arranged linearly slidable in the direction of the relative movement.

* * * * *